(12) United States Patent
Fister et al.

(10) Patent No.: US 9,538,883 B2
(45) Date of Patent: Jan. 10, 2017

(54) GRATING DISC FOR A FOOD PROCESSOR AND A FOOD PROCESSOR COMPRISING A GRATING DISC

(75) Inventors: Ines Fister, Ferlach (AT); Juergen Holzbauer, Maria Rain (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 388 days.

(21) Appl. No.: 13/512,140

(22) PCT Filed: Dec. 10, 2010

(86) PCT No.: PCT/IB2010/055734
§ 371 (c)(1),
(2), (4) Date: May 25, 2012

(87) PCT Pub. No.: WO2011/073872
PCT Pub. Date: Jun. 23, 2011

(65) Prior Publication Data
US 2012/0272835 A1    Nov. 1, 2012

(30) Foreign Application Priority Data
Dec. 17, 2009  (EP) .................................... 09179640

(51) Int. Cl.
*A47J 43/14*    (2006.01)
*B26D 1/00*    (2006.01)
(Continued)

(52) U.S. Cl.
CPC ............. *A47J 43/255* (2013.01); *A47J 19/027* (2013.01)

(58) Field of Classification Search
CPC ......... A47J 43/25; A47J 43/255; A47J 19/027
(Continued)

(56) References Cited

U.S. PATENT DOCUMENTS 5,479,851 A * 1/1996 McClean et al. ............... 99/512
5,537,918 A * 7/1996 Patel et al. ...................... 99/510
(Continued)

FOREIGN PATENT DOCUMENTS

CH          318753 A       1/1957
DE          850360 C       9/1952
(Continued)

*Primary Examiner* — Dana Ross
*Assistant Examiner* — Lindsey C Teaters

(57) ABSTRACT

A grating disc (4) arranged to be mounted within a food processor (1) and to be rotated in a direction of rotation (26). The grating disc (4) comprising at least one grating tooth (24) for grating food to be processed which tooth protrudes from a surface of the grating disc. The tooth (24) has an uninterrupted, continuous envelope surface (29) forming an outer contour of said tooth (24) which surface has gradient which spatial derivative does not change sign. The envelope surface comprises a front surface (30) which is, during use, the leading surface of the grating tooth (24). The front surface (30) extends from the grating said disc surface (23) to a distal end of the grating tooth, and is adapted to be brought into contact with said food during use of said food processor (1). The front surface (30) is delimited in one direction by the grating disc surface, and in at least one other direction by at least one grating edge (32). Due to this improved grating disc less food particles remaining on the grating disc—i.e. less processed food being caught by the grating tooth—implying improved cleanability of the grating disc after use.

11 Claims, 3 Drawing Sheets

(51) Int. Cl.
*B02C 15/00* (2006.01)
*B04B 5/10* (2006.01)
*A47J 43/25* (2006.01)
*A47J 19/02* (2006.01)

(58) Field of Classification Search
USPC .................................. 99/503, 509, 510, 511
See application file for complete search history.

(56) References Cited

U.S. PATENT DOCUMENTS

| | | | |
|---|---|---|---|
| 6,397,736 | B1 | 6/2002 | Tseng et al. |
| 7,040,220 | B1 | 5/2006 | Cohen et al. |
| 2003/0071150 | A1* | 4/2003 | Ruttimann ..................... 241/92 |
| 2007/0209528 | A1 | 9/2007 | Chang |
| 2010/0050886 | A1* | 3/2010 | Obersteiner et al. ........... 99/507 |

FOREIGN PATENT DOCUMENTS

| | | |
|---|---|---|
| DE | 1141760 B | 12/1962 |
| DE | 202004010673 U1 | 1/2005 |
| FR | 725553 | 5/1932 |
| FR | 2695338 A1 | 3/1994 |
| JP | 4992268 A | 9/1974 |
| JP | 0482520 A | 3/1992 |
| JP | 2005013517 A | 1/2005 |
| TW | 200803781 A | 1/2008 |

* cited by examiner

GRATING DISC FOR A FOOD PROCESSOR AND A FOOD PROCESSOR COMPRISING A GRATING DISC

FIELD OF THE INVENTION

The present invention relates to a grating disc arranged to be mounted within and rotated during use of a food processor.

The present invention further relates to a food processor comprising a grating disc.

BACKGROUND OF THE INVENTION

In order to facilitate and/or refine preparation of food, one may choose the assistance of a food processor. A food processor may be utilized for a variety of processing operations, for instance to prepare food by juicing, squeezing, mixing, cutting, grinding, chopping, slicing, grating, milling or shredding. Different ranges of use and varying sizes of food articles to be processed have resulted in a variety of food processors being available on the market, in various sizes and forms. The food processor may be multifunctional or optimized for one or more special tasks so as to operate, for example, as a centrifugal juicer for extracting juice.

In most cases, the food processor is electrical, having an inlet piece to feed the food to be processed downwardly onto a rotating element such as a grating disc or the like driven by a motor accommodated in the housing of the food processor. Furthermore, in order to grate food or extract juice, the rotating disc is typically provided with grating teeth. Juice extractors using a grating disc may extract juice from for instance a fruit or a vegetable by pressing it onto the grating disc, which grates material from the surface of the fruit or vegetable while at the same time releasing the juice. The grated material and the juice are typically thrown upwardly and outwardly by centrifugal forces against the surface of a filter surrounding the grating disc. The pulp carries on over the edge of the filter and is collected in a suitable receptacle while the finely filtered juice passes through the filter into another receptacle. The juice is thereby ready to be served.

The juice yield of current food processors is however commonly not satisfying, as the grating discs utilized in these juice extractors typically are not fully elaborated to get the highest possible juice output. Furthermore, after use of the food processor, fibers of juiced fruit typically remain on the grating disc as a result of food particles adhering to the grating teeth of the grating disc. Conventional manufacturing methods typically result in a grating tooth shape with an undercut, where fruit fibers etc may be trapped. Accordingly, it may be necessary to clean the grating disc thoroughly, and typically the user utilizes a cleaning accessory like a brush or even his fingers. Cleaning of the grating disc may hence be a hassle to the user and in the latter case additionally a hazard, as the user risks cutting his fingers on the grating teeth while cleaning the disc.

In order to overcome these matters, U.S. Pat. No. 7,040,220 introduces a juice extractor appliance comprising a cutter disc including a projecting pinching surface to better assure the complete cutting up of the food article into pulp saturated with juice. This solution implies the need for extra parts—i.e. the projecting pinching surface—which may hence in turn imply additional cost and/or a more complex manufacturing procedure.

Accordingly, there is still a need for an alternative grating disc elaborated for improved yield of processed food such as juice, and/or for facilitated cleanability after use, according to which the above-related drawbacks are at least partly eliminated.

SUMMARY OF THE INVENTION

According to the invention, the above need is at least partly met by a grating disc arranged to be mounted within a food processor and to be rotated in a direction of rotation, said grating disc comprising at least one grating tooth for grating food to be processed, said grating tooth protruding from a surface of said disc and having an uninterrupted, continuous envelope surface forming an outer contour of said grating tooth, said envelope surface having a gradient which spatial derivative does not change sign, wherein said envelope surface comprises a front surface which front surface is, during use, the leading surface of said grating tooth, said front surface extending from said disc surface to a distal end of said grating tooth, and is adapted to be brought into contact with said food during use of said food processor, and wherein said front surface is delimited in one direction by said disc surface, and in at least one other direction by at least one grating edge.

The "envelope surface" is intended to indicate an outer surface of the tooth. This surface is uninterrupted, i.e. there are no holes or undercuts, only a continuous surface which is easy to clean. By "disc surface" is here intended the plane in which the disc has its general extension, i.e. not considering any indentations or irregularities in the disc.

The present invention is based on the realization that satisfactory grating may be achieved by a relatively blunt grating edge surrounding a front surface. As a result, there is no need for sharp edges or cavities, which is typical for conventional grating teeth. In a preferred embodiment, the front surface forms an angle in the range of 60 to 120 degrees with adjacent portions of the envelope surface along said grating edges. It has been found that an angle along the grating edges in the range of 60 to 120 degrees delivers good grating results. Even more preferably, this angle is in the range of 80 to 100 degrees and most preferably this angle is approximately 90 degrees, to achieve optimal grating results.

With a grating disc in accordance with the present invention, improved output of processed food is accomplished as food particles are prevented from adhering to the grating tooth of the grating disc during use of the food processor. Less food particles hence remain on the grating disc, whereby a higher yield of retrieved processed food is attained, i.e. a higher quantity of food particles may be extracted. Furthermore, less food particles remaining on the grating disc—i.e. less processed food being caught by the grating tooth—implies improved cleanability of the grating disc after use. The user may merely need to rinse the grating disc to remove caught food particles rather than applying a brush or his fingers for thorough cleaning. With a reduced temptation or need to clean the grating disc with ones fingers, unhygienic and/or dangerous touching is hence additionally avoided.

In an embodiment the front surface and the disc surface are at an angle of 90 to 100 degrees. Such an angle may further improve the efficiency of the grating edges as well as cleanability of the grating disc. For angles less than 90 degrees an overhang is created in which food particles can adhere or be trapped. For angles greater than 100 degrees the grating efficiency of the grating tooth was found to deteriorate leading to longer processing times during grating.

According to one embodiment, the angle between the envelope surface and the disc surface is more than 90 degrees everywhere along a base of the tooth. By "base end" is intended the end of the tooth level with the disc. This means that the tooth has no "overhang" where fibers can be trapped.

The envelope surface may further comprising a rear surface located downstream the front surface with respect to the direction of rotation, the rear surface meeting the disc surface at an angle of 90 to 135 degrees, preferably 120-135 degrees. Such a sloping rear surface further improves the cleanability of the tooth, as there is no edge in the rear direction of the teeth, allowing for an easy cleaning with e.g. a sponge. The sloping rear surface also prevents fibers from wrapping around the tooth, thereby avoiding the accumulation of food stuff that impairs the function of the disc.

The envelope surface may further comprises an intermediate surface, connecting the front surface and the rear surface, the intermediate surface having a continuous gradient in a direction perpendicular to the direction of rotation. Such a smooth intermediate surface may further improve the cleanability of the tooth.

The envelope surface may further comprise two side surfaces connecting the front surface and the rear surface, wherein each side surface extends from the disc surface on one side of the tooth. The side surfaces may extend to an intermediate surface, forming a top surface, or may meet along a ridge extending substantially in said direction of rotation. Such a ridge, or indeed any pointed or tilted surface on the top of the tooth, increases the intrusion in the food stuff for a given applied pressing force.

According to a particular embodiment, the tooth has the shape of a pyramid, and the front surface, the rear surface, and the side surfaces form the sides of this pyramid. The envelope surface may, with the exception of the grating edges, have a continuous gradient in a direction of rotation of the disc. Such a design ensures that all grating is provided by the grating edge.

According to one embodiment, the grating disc comprises a plurality of grating teeth arranged in at least one line extending from an inner region toward an outer region of the grating disc. With a plurality of grating teeth, the food may be processed more efficiently. Furthermore, by arranging the grating teeth in a line extending from the inner region toward the outer region, even further processing efficiency may be accomplished. That is, since grating teeth are placed along a greater part or even the entire radial extension of the grating disc, a greater part or even the entire grating disc may be utilized for the processing of food. The line need not necessarily be a straight line, but may likewise take on any feasible form such as for instance being curved in a convex manner. Notably, the inner region is preferably a centered portion of the grating disc, but "inner region" is intended to likewise cover a portion of the grating disc having a slight offset from the grating disc center.

In a preferred embodiment the grating disc surface does not contain indentations. Food particles can, during use, easily be caught in or adhere to indentations in the grating disc surface. The user will have to spend significant effort to remove the caught food particles from the grating disc. A grating disc without such indentions is be easier to clean.

The grating disc according to the invention is intended to be used within a food processor for processing of food. The food processor is for instance a centrifugal juicer, the food to be processed for instance a piece of fruit or vegetable to be grated, and the resulting processed food accordingly for instance juice and pulp. In order to separate the pulp from the juice, the grating disc may in a manner known in the art be surrounded by a filter such as a sieve of frustoconical shape, whereby during use of the food processor—i.e. during rotation of the grating disc and as a result of centrifugal forces—the pulp may be carried over the edge of the filter while the finely filtered juice may pass there through. Other alternatives for separating the pulp from the juice are likewise within the scope. The grating disc is preferably mounted to rotate horizontally within the food processor, and/or in a plane perpendicular to a feeding direction of the food to be processed, but may, if appropriate for the implementation at hand, be rotatably mounted in any feasible plane. Out of convenience as well as for optimized functionality, the grating disc has an essentially flat disc surface, from which at least one grating tooth protrudes. "Essentially flat disc surface" is here intended to include as well "close to" flat and "almost" flat, thus including minor deviations from a flat disc surface.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention. Like reference characters refer to like elements throughout.

FIG. 2b is a perspective view of a grating tooth of FIG. 2a.

DETAILED DESCRIPTION

Figure 1:
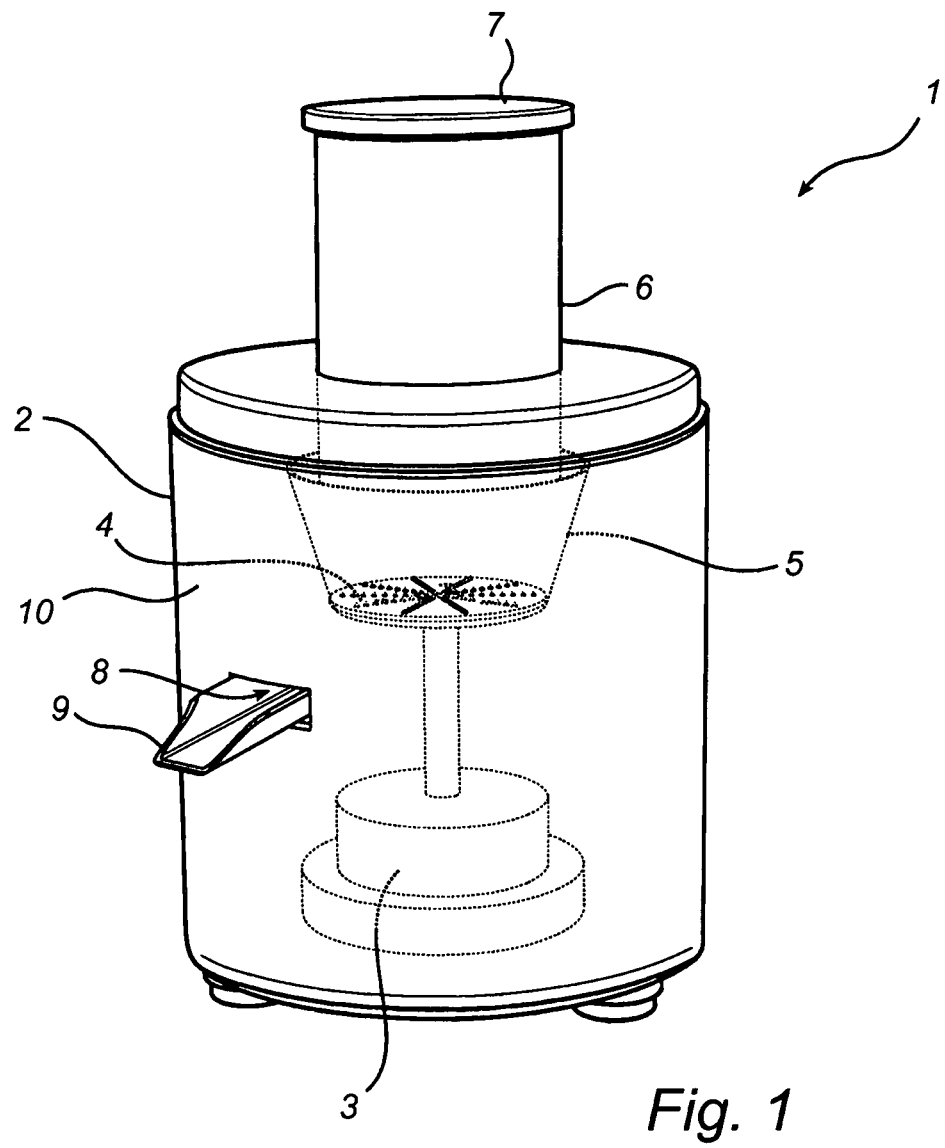
FIG. 1 presents an exemplifying food processor in which the present invention may be implemented.

FIG. 1 presents an exemplifying food processor 1 in accordance with a first embodiment of the present invention. The food processor 1 is here a centrifugal juicer, but according to alternative embodiments, other food processors are likewise within the scope. Accordingly, although the centrifugal juicer 1 here is adapted for extracting juice from pieces of fruit or vegetables, alternative food processors may hence be adapted for processing of any other feasible food.

The centrifugal juicer 1 of FIG. 1 comprises an inlet piece 6 for introducing the e.g. piece of fruit into the centrifugal juicer 1. In order to manually push the piece of fruit downwardly, the centrifugal juicer 1 may furthermore comprise a pusher 7. Notably, the shape and dimensions of the inlet piece 6 and/or pusher 7 may be selected with the implementation at hand in mind, and the design is not crucial to the invention. The centrifugal juicer 1 furthermore comprises a housing 2, which accommodates an electrical motor 3 with a driving shaft for rotating a grating disc 4 mounted on the driving shaft. Here, a direction of rotation of the grating disc 4 takes place in a horizontal plane perpendicular to a feeding direction of the inlet piece 6, although other directions could be chosen for alternative embodiments. The grating disc 4 is arranged in the middle of a frustoconical filter sieve 5 adapted to separate the juice from the pulp and to direct the juice to an outlet tube 8. The outlet tube 8 is overlying a spout 9 arranged for outputting the extracted juice into a receptacle (not shown) to be placed there under. Additionally, a pulp receptacle 10 is provided to receive the pulp in the sieve 5 after extraction of the juice there from. Notably, any other feasible alternative positioning of the grating disc 4 within the sieve 5 is likewise within the scope, as well as filters 5 of other shapes.

The centrifugal juicer 1 is arranged such that upon rotation of the grating disc 4, the piece of fruit is grated by the grating disc 4, whereby juice and pulp are thrown against the filter sieve 5. The juice accordingly drips through the sieve 5 and is transported to the outlet tube 8 for retrieval via the spout 9 while the pulp is ejected over an edge of the sieve 5 to be collected in the pulp receptacle 10. Here, both the grating disc 4 and the filter sieve 5 are arranged to be rotated, although according to alternative embodiments only the grating disc 4 could be arranged to rotate. In the former case, the pulp is more efficiently ejected into the pulp receptacle 10, but the motor 3 may need to have more power.

Insofar as described above, such food processors 1 and varieties thereof are known in the art. However, the novel features of the grating disc 4 introduced with the present invention are yet to be explained, and will in the following so be with reference to FIG. 2.

Figure 2A:
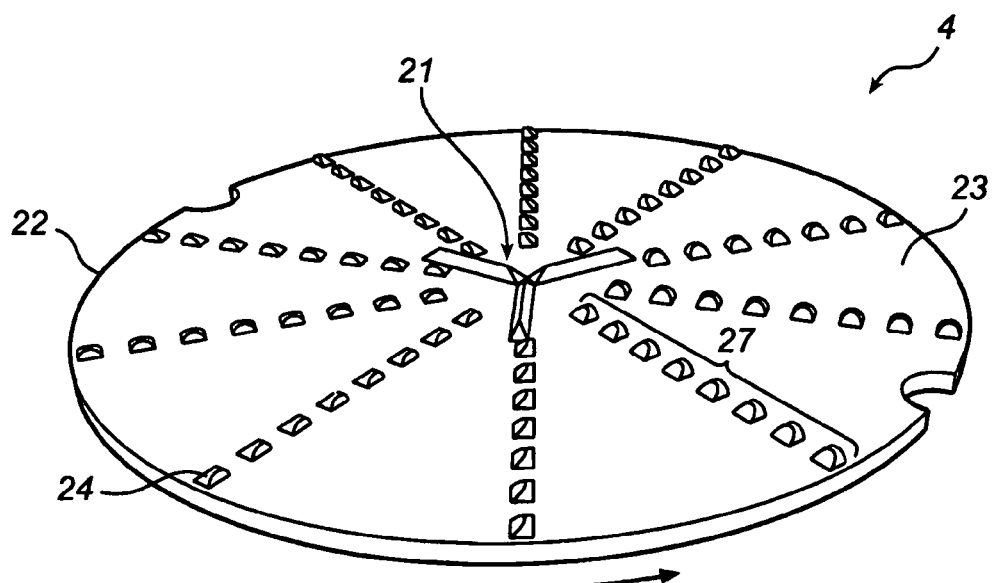
FIG. 2a illustrates a grating disc according to a first embodiment of the present invention.

FIG. 2a illustrates the grating disc 4 of the first embodiment in greater detail. The grating disc 4 comprises an inner region 21, here positioned essentially centrally on the grating disc 4, and an outer region 22, here representing the outer edge—i.e. the perimeter—of the grating disc 4. The grating disc 4 has an essentially flat disc surface 23 from which a plurality of grating teeth 24 protrudes for grating of food as the grating disc 4 rotates in the direction of rotation 26. The grating teeth 24 are according to this first embodiment arranged in a plurality of lines 27 extending from the inner region 21 toward the outer edge 22. Here, the grating teeth 24 and the lines 27 of teeth are essentially uniformly distributed on the disc surface 23, extending essentially all the way out to the outer edge 22. Notably, however, according to alternative embodiments, the lines need not necessarily to extend as far out as to the outer edge 22 nor be uniformly distributed. For instance, there may only be a single line 27 provided, the lines 27 may to further extent comprise different numbers of grating teeth 24, the grating teeth may be more spaced apart in one line 27 compared to another 27, and one line 27 may be shorter than another 27 etc. Furthermore, here the lines 27 have a straight disposition, although according to alternative embodiments, the lines 27 may for instance be curved or be formed in any other feasible manner across the disc surface 23.

The disc and grating teeth may generally comprise any appropriate material, such as metal (steel, aluminum, titan, etc), ceramics, plastic or any combination of these materials. It may be manufactured with any suitable technique, including grinding, eroding, stamping, pressing, molding, assembly. Each tooth may be a hollow or solid body. A solid body may provide not only for a simplified manufacturing procedure, but additionally to secure an uninterrupted grating surface. The tooth may also be semi-solid, e.g. have a hollow lower part and a solid top part.

In order to contribute to pulp being prevented from adhering to the grating disc 4—and specifically the grating teeth 24—during use of the centrifugal juicer 1, according to the present invention, consideration is taken to the design of the grating teeth 24. A grating tooth 24 according to this first embodiment will hence in the following be described in further detail with reference to FIG. 2b.

Figure 2B:
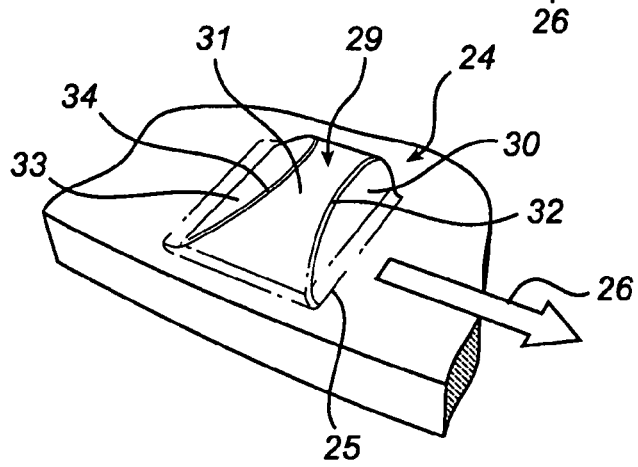

FIG. 2b presents a perspective view of a grating tooth 24 of FIG. 2a. According to this first embodiment, the grating tooth 24 is a solid body, although according to alternative embodiments other options are feasible. The grating tooth 24 has an uninterrupted envelope surface 29 extending from a base 25 to a closed distal end. The envelope surface comprises a front surface 30 intended to be brought into contact with e.g. a piece of fruit during use of the centrifugal juicer 1. The front surface 30 faces the direction of rotation 26 of the grating disc. Thus the front surface 30 will, during use of the food processor, lead the grating tooth. The front surface forms an angle γ with the disc surface 23 of the grating disc. In the illustrated case, this angle γ is approximately 90 degrees, but may typically be in the range 90-100 degrees. The grating tooth 24 further comprises a rear surface 33 opposed to the front surface 30, which rear surface 33 meets the disc surface 23 at an angle β, which is here around 135 degrees. The envelope surface 29 further comprises an intermediate surface 31, extending between the front and rear surfaces. The intermediate surface 31 preferably has a continuous gradient in the direction of rotation 26, and is here outwardly convex seen in a direction perpendicular to the direction of rotation 26.

Figure 2C:
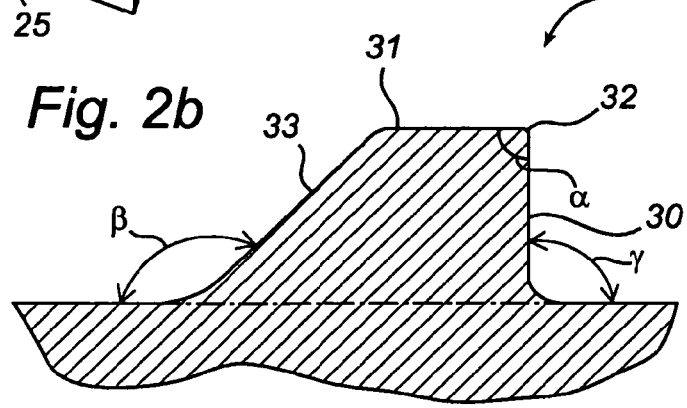
FIG. 2c is a sectional view of the grating tooth in FIG. 2b.

The grating tooth in FIG. 2b is shown in a sectional view in FIG. 2c. In order to ensure that the grating tooth 24 provides cutting functionality during rotation of the grating disc 4, the intermediate surface 31 meets the front surface 30 along a grating edge 32 at an angle α. The angle α may take on any feasible value, for instance ranging between 60 to 120 degrees, providing satisfying cutting functionality; here, however, the grating angle α of the grating edge 32 is approximately 90 degrees. The rear surface 33 of the grating tooth 24 does here not necessarily contribute to the cutting functionality of the grating tooth 24, but is rather adapted to avoid food particles from adhering thereto and to lack sharp edges on which a user potentially cleaning the grating disc with his fingers may risk injuring himself. The angle β between the rear surface 33 and the disc surface 23 is chosen so that the rear surface forms a smooth slope which is easy to clean. In the illustrated case, the angle β is approximately 135 degrees.

In use of the centrifugal juicer 1 of the first embodiment, the piece of fruit may be introduced through the inlet piece 6, possibly manually pushed by the pusher 7 towards the grating disc 4, which is rotated by means of the motor 3 in the direction of rotation 26. The grating teeth 24 arranged in lines 27 grate the piece of fruit by means of their respective grating surfaces 29 as the piece of fruit is pressed against the grating disc 4. As a result of the characteristics of the introduced grating teeth 24—which contribute to food particles being prevented from adhering to the grating teeth 24—less processed food remain on the grating disc 4. The grated material, i.e. the pulp and the juice, is thrown upwardly and outwardly be centrifugal forces against the sieve 5. The pulp then carries on over the edge of the sieve 5 and is collected in the pulp receptacle 10 while the finely filtered juice passes through the sieve 5 to be transported to the outlet tube 8 and spout 9. Accordingly, a higher yield of retrieved juice may be attained, and additionally, with less pulp and juice remaining on the grating disc 4 after use of the centrifugal juicer 1, improved cleanability of the grating disc 4 may be achieved.

Figure 3A:
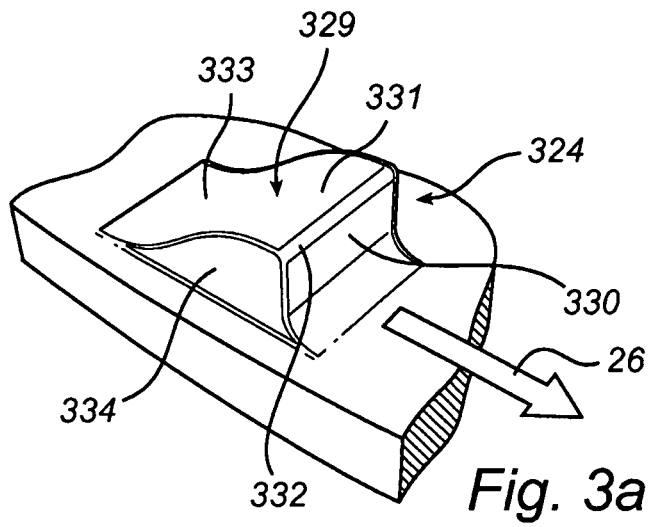
FIG. 3a presents a perspective view of a grating tooth according to a second embodiment of the present invention.

FIG. 3a presents a perspective view of an alternative exemplifying grating tooth 324 according to a second embodiment of the present invention. Since the grating tooth 324 of this second embodiment to great extent resembles the grating tooth 24 of the first embodiment, only features distinguishing the second embodiment from the first will be discussed in the following.

Similar to the envelope surface 29 of FIG. 2*b*, the envelope surface 329 of FIG. 3*a* is uninterrupted and comprises the front surface 330 as well as a rear surface 333. The rear surface 333 smoothly transitions into an intermediate surface 331, extending to the front surface. Finally, the envelope surface 329 comprises side surfaces 334, extending from the disc surface on either side of the front surface 330. The front surface 331 here has an essentially rectangular cross-section, and grating edges 332 are formed where the front surface 330 meets the intermediate surface 331 and side surfaces 334.

Figure 3B:
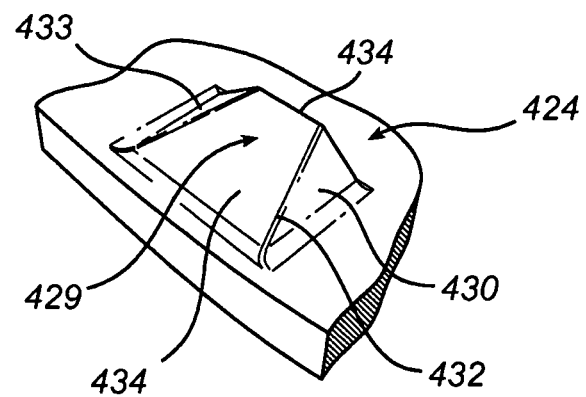
FIG. 3b illustrates a perspective view of a grating tooth according to a third embodiment of the present invention.

FIG. 3*b* illustrates a perspective view of yet another alternative exemplifying grating tooth 424 according to a third embodiment of the present invention. Since the grating tooth 424 of this third embodiment to great extent resembles the grating tooth 24 of the first embodiment, only features distinguishing the third embodiment from the first will be discussed in the following. The envelope surface 429 of the tooth in FIG. 3*b* here comprises a triangular front surface 430 as well as a triangular rear surface 433. Two side surfaces 434 extend between the front and rear surfaces, but here the side surfaces are inclined towards each other, and meet along a ridge 434 extending substantially along the direction of rotation 26. The side surfaces further meet the front surface 430 at along two grating edges 432; here at an essentially 90 degrees grating angle.

Figure 3C:
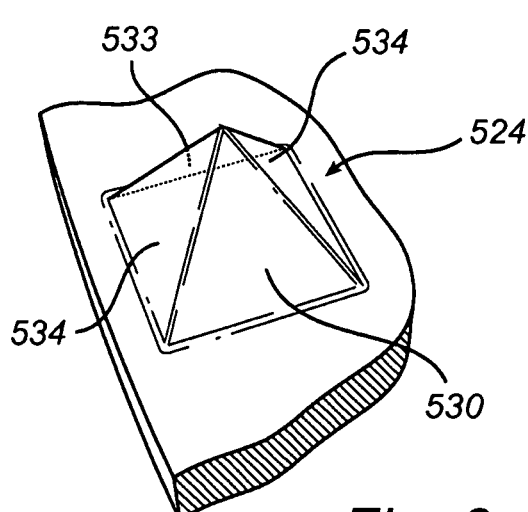
FIG. 3c illustrates a perspective view of a grating tooth according to a fourth embodiment of the present invention.

FIG. 3*c* illustrates yet another embodiment of a tooth according to the present invention. In this case, the tooth 524 is pyramid shaped, with a front surface 530, a rear surface 533, and two side surfaces 534.

In the above, a variety of implementations of the present invention has been provided, which enables for improved output of processed food in that food particles are prevented from adhering to the grating tooth 24, and hence the grating disc 4, during use of the food processor 1. However, the person skilled in the art realizes that the present invention by no means is limited to the preferred embodiments described above. On the contrary, many modifications and variations are possible within the scope of the appended claims. For instance, parts of the food processor 1 such as the inlet piece 6, pusher 7, sieve 5, outlet tube 8, spout 9 and pulp receptacle 10, and their dimensions, positioning in relation to each other, as well as their actual presence may differ from one embodiment to another. For instance, the outlet tube 8 and/or spout 9 may be replaced or supplemented by a juice receptacle which may surround the filter sieve 5. Furthermore, the inlet piece 6 may for instance be a feeding tube, and/or the pusher 7 may not be required for pushing the food downwardly onto the grating disc 4.

Variations to the disclosed embodiments can be understood and effected by the skilled addressee in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. A grating disc arranged to be mounted within a food processor and to be rotated in a direction of rotation, said grating disc comprising:
   an un-indented disk surface; and
   at least one grating tooth-protruding from said un-indented surface, each of said at least one grating tooth comprising:
   a front surface, representing a leading surface of said grating tooth, said front surface extending from said un-indented surface and brought into contact with a food as said disk surface rotates in said direction of rotation, and
   a grating edge substantially surrounding said front surface, wherein said grating edge forms an angle (α) in a range of 60-120 degrees with said front surface, and
   a rear surface located downstream from said front surface with respect to a direction of rotation of said disc, said rear surface meeting said disc surface at an angle (β) of 90-135 degrees; and
   an intermediate surface smoothly transitioning between said grating edge and said rear surface, said intermediate surface extending from the disk surface on corresponding sides of said grating tooth, wherein the intermediate surface comprises a curved outwardly convex shape in a direction perpendicular to the direction of rotation.

2. The grating disc according to claim 1, wherein said front surface and the disc surface are at an angle (γ) of 90-100 degrees.

3. A grating disc according to claim 1, wherein an angle (β) between said rear surface and said disc surface is more than 90 degrees everywhere along a base of said tooth.

4. The grating disc according to claim 1, wherein said intermediate surface comprising: a continuous gradient from the grating edge to the rear surface in a direction in the direction of rotation.

5. The grating disc according to claim 1, wherein said intermediate surface comprising:
   two side surfaces connecting said grating edge and said rear surface.

6. The grating disc according to claim 5, wherein said side surfaces meet along a ridge extending substantially in said direction of rotation.

7. The grating disc according to claim 1, wherein said grating disc comprises a plurality of grating teeth arranged in at least one line extending from an inner region toward an outer region of said grating disc.

8. A food processor for extracting juice, comprising a grating disc comprising:
   an un-indented disk surface; and
   at least one grating tooth protruding from said un-indented surface, each of said at least one grating tooth comprising:
   a front surface representing a leading surface of said grating tooth, said front surface extending, at a first angle, from said un-indented surface, said front surface being adapted to be brought into contact with a food as said disk surface is rotated in a direction of rotation, and
   a grating edge substantially surrounding said front surface, wherein said grating edge forms an angle (α) in a range of 60-120 degrees with said front surface,
   a rear surface located downstream from said front surface with respect to a direction of rotation of said disc, said rear surface meeting said disc surface at an angle (β) of 90-135 degrees; and
   an intermediate surface smoothing transitioning between said grating edge and said rear surface, said intermediate surface extending from the disk surface on corresponding sides of said grating tooth, wherein the intermediate surface comprises a curved outwardly convex shape in a direction perpendicular to the direction of rotation.

9. The food processor according to claim 8, wherein said food processor is a centrifugal juicer.

10. The grating disc according to claim 8, wherein said first angle is in a range of 80-100 degrees.

11. The grating disc according to claim 10, wherein said first angle is approximately 90 degrees.

\* \* \* \* \*